US008488480B2

(12) United States Patent
Han et al.

(10) Patent No.: US 8,488,480 B2
(45) Date of Patent: Jul. 16, 2013

(54) APPARATUS AND METHOD FOR INTER-CELL INTERFERENCE CANCELLATION IN MIMO WIRELESS COMMUNICATION SYSTEM

(75) Inventors: Shuangfeng Han, Suwon-si (KR);
Eun-Yong Kim, Hwaseong-si (KR);
Hyeon-Woo Lee, Suwon-si (KR);
Ho-Kyu Choi, Seongnam-si (KR);
Joon-Ho Park, Seongnam-si (KR);
David Mazzarese, Suwon-si (KR);
Bruno Clerckx, Yongin-si (KR);
Song-Nam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 12/498,585

(22) Filed: Jul. 7, 2009

(65) Prior Publication Data
US 2010/0002643 A1 Jan. 7, 2010

(30) Foreign Application Priority Data

Jul. 7, 2008 (KR) ........................ 10-2008-0065664

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)

(52) U.S. Cl.
USPC ........... 370/252; 370/328; 455/504; 455/513; 455/67.13; 455/63.1; 455/114.2

(58) Field of Classification Search
USPC .............. 370/252, 328; 455/504, 513, 67.13, 455/63.1, 114.2
See application file for complete search history.

(56) References Cited

U.S. PATENT DOCUMENTS

| | | | | |
|---|---|---|---|---|
| 8,140,019 | B2* | 3/2012 | Kim et al. | 455/63.1 |
| 8,179,819 | B2* | 5/2012 | Kim et al. | 370/254 |
| 8,369,788 | B2* | 2/2013 | Kim et al. | 455/63.1 |
| 2004/0116122 | A1* | 6/2004 | Zeira et al. | 455/445 |
| 2006/0209923 | A1 | 9/2006 | Jin et al. | |
| 2007/0104283 | A1 | 5/2007 | Han et al. | |
| 2007/0153935 | A1* | 7/2007 | Yang et al. | 375/267 |
| 2007/0160162 | A1* | 7/2007 | Kim et al. | 375/267 |
| 2008/0039129 | A1* | 2/2008 | Li et al. | 455/522 |
| 2008/0132281 | A1* | 6/2008 | Kim et al. | 455/562.1 |
| 2008/0212701 | A1* | 9/2008 | Pan et al. | 375/260 |
| 2008/0273624 | A1* | 11/2008 | Kent et al. | 375/296 |
| 2009/0028112 | A1* | 1/2009 | Attar et al. | 370/332 |
| 2009/0215480 | A1* | 8/2009 | Kim et al. | 455/501 |
| 2009/0304125 | A1* | 12/2009 | Kim et al. | 375/341 |
| 2010/0020704 | A1* | 1/2010 | Hu et al. | 370/252 |
| 2010/0316154 | A1* | 12/2010 | Park et al. | 375/267 |
| 2011/0034192 | A1* | 2/2011 | Lim et al. | 455/501 |

* cited by examiner

*Primary Examiner* — Alpus H Hsu
*Assistant Examiner* — Yee Lam
(74) *Attorney, Agent, or Firm* — Jefferson IP Law, LLP (57) ABSTRACT

A method for operating a Mobile Station (MS) in a Multiple Input Multiple Output (MIMO) wireless communication system is provided. The method includes measuring channel quality for a serving Base Station (BS), if the channel quality is less than a threshold, measuring interference power from one or more neighbor BSs, determining a Precoding Matrix Index (PMI) and a priority metric for each neighbor BS, and feeding back at least one of the PMI, a PMI type indicator, the priority metric, and the channel quality to the serving BS.

30 Claims, 6 Drawing Sheets

APPARATUS AND METHOD FOR INTER-CELL INTERFERENCE CANCELLATION IN MIMO WIRELESS COMMUNICATION SYSTEM

PRIORITY

The present application claims the benefit under 35 U.S.C. §119(a) of a Korean patent application filed in the Korean Intellectual Property Office on Jul. 7, 2008 and assigned Serial No. 10-2008-0065664, the entire disclosure of which is hereby incorporated by reference.

BACKGROUND OF THE INVENTION

1. Field of the Invention

The present invention relates to a Multiple Input Multiple Output (MIMO) wireless communication system. More particularly, the present invention relates to an apparatus and method for inter-cell interference cancellation in a MIMO wireless communication system.

2. Description of the Related Art

In the next generation communication system, also known as the 4th Generation (4G) communication system, research is actively in progress to provide a variety of Quality of Services (QoS) with a data transfer speed of about 100 Mbps. A representative example of such a communication system is an Institute of Electrical and Electronics Engineers (IEEE) 802.16 system. The IEEE 802.16 system employs an Orthogonal Frequency Division Multiplexing (OFDM)/Orthogonal Frequency Division Multiple Access (OFDMA) scheme so that a broadband network can be supported in a physical channel.

Figure 1:
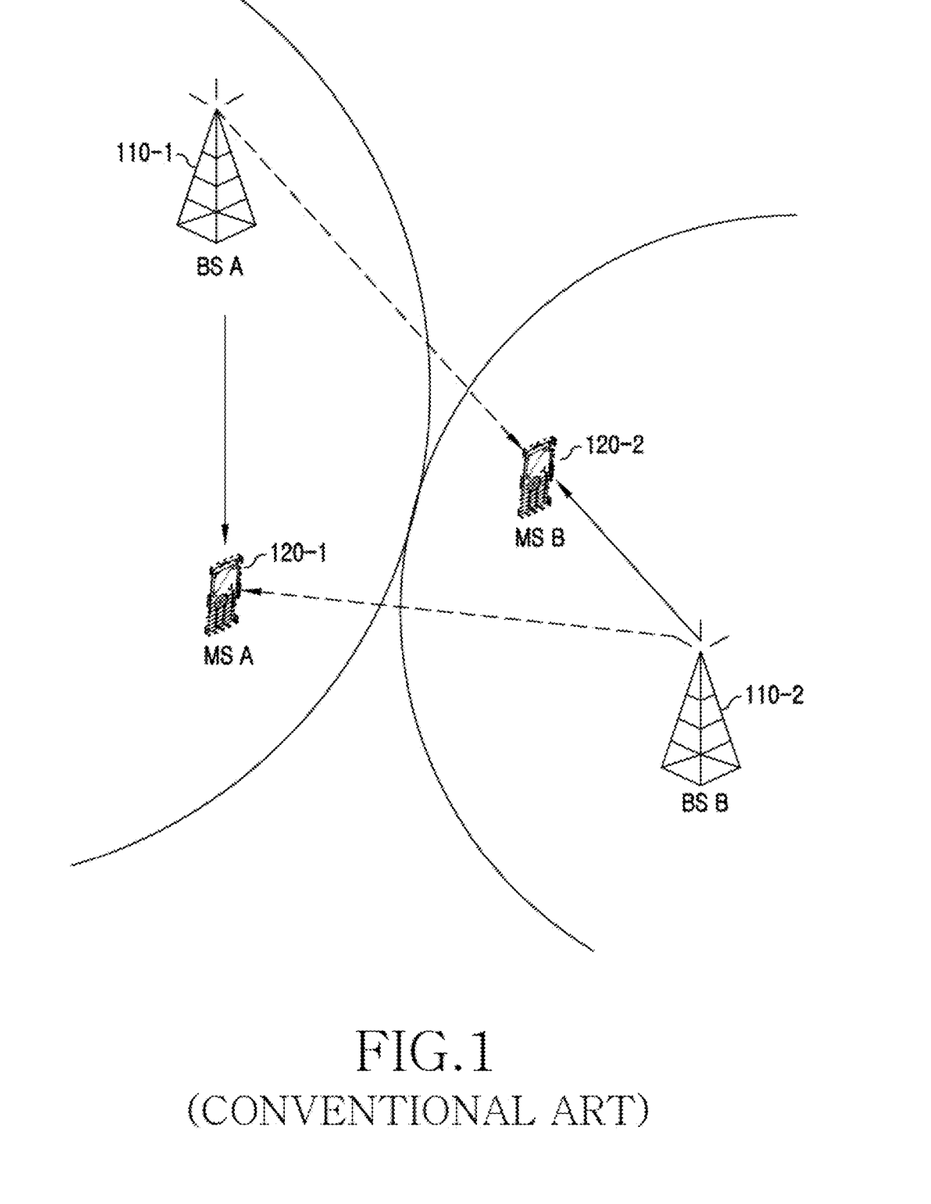
FIG. 1 is a schematic diagram for explaining generation of inter-cell interference in a conventional wireless communication system.

In a broadband wireless communication system using the OFDM/OFDMA scheme such as the IEEE 802.16 system, orthogonal radio resources are allocated to Mobile Stations (MSs). Therefore, interference between the MSs is not significant in one cell. However, if a frequency reuse rate is 1, the same band is used in neighbor Base Stations (BSs). Thus, an MS located at a cell's edge experiences interference due to a signal of another MS which uses the same radio resource in a neighbor cell. For example, in a conventional wireless communication system as illustrated in FIG. 1, an MS-A 120-1 receives downlink data by decoding a signal received using a radio resource allocated by a BS-A 110-1. In this case, if the radio resource allocated by the BS-A 110-1 to the MS-A 120-1 is identical to a radio resource allocated by a BS-B 110-2 to an MS-B 120-2, the MS-A 120-1 receives both a downlink signal to be transmitted to the MS-A 120-1 and a downlink signal to be transmitted to the MS-B 120-2. Accordingly, the MS-A 120-1 performs decoding on a mixed signal of the two downlink signals and data reception is not properly achieved. That is, the downlink signal to be transmitted to the MS-B 120-1 acts as interference to the MS-A 120-1.

As described above, in a broadband wireless communication system using the OFDM/OFDMA scheme such as the IEEE 802.16 system, inter-cell interference results in system performance deterioration due to downlink or uplink signals transmitted from different cells but using the same frequency resource or time resource. Accordingly, there is a need for a method for effectively cancelling inter-cell interference.

SUMMARY OF THE INVENTION

An aspect of the present invention is to address at least the above-mentioned problems and/or disadvantages and to provide at least the advantages described below. Accordingly, an aspect of the present invention is to provide an apparatus and method for inter-cell interference cancellation in a Multiple Input Multiple Output (MIMO) wireless communication system.

Another aspect of the present invention is to provide an apparatus and method for inter-cell interference cancellation using precoding of a neighbor Base Station (BS) in a MIMO wireless communication system.

Another aspect of the present invention is to provide an apparatus and method for determining priority when a preceding matrix is selected to cancel inter-cell interference of a neighbor BS in a MIMO wireless communication system.

Another aspect of the present invention is to provide an apparatus and method for providing Normalized Interference Power (NIP) information used to determine priority when a precoding matrix is selected in a MIMO wireless communication system.

In accordance with an aspect of the present invention, a method for operating a Mobile Station (MS) in a MIMO wireless communication system is provided. The method includes measuring channel quality for a serving BS, if the channel quality is less than a threshold, measuring interference power from one or more neighbor BSs, determining a Precoding Matrix Index (PMI) and a priority metric for each neighbor BS, and feeding back at least one of the PMI, a PMI type indicator, the priority metric, and the channel quality to the serving BS.

In accordance with another aspect of the present invention, a method of operating a BS in a MIMO wireless communication system is provided. The method includes receiving, from a neighbor BS, cooperative interference cancellation-related information including a priority metric and PMI requests of MSs connected to the neighbor BS, determining a first priority among PMI requests of the MSs according to the priority metric, and selecting a PMI according to the first priority.

In accordance with yet another aspect of the present invention, an MS apparatus in a MIMO wireless communication system is provided. The apparatus includes a measurer for measuring channel quality for a serving BS, and if the channel quality is less than a threshold, for measuring interference power from one or more neighbor BSs, a calculator for determining a PMI and a priority metric for each neighbor BS, and a transmitter for feeding back at least one of the PMI, a PMI type indicator, the priority metric, and the channel quality to the serving BS.

In accordance with still another aspect of the present invention, a BS apparatus in a MIMO wireless communication system is provided. The apparatus includes a communication unit for receiving, from a neighbor BS, cooperative interference cancellation-related information including a priority metric and PMI requests of MSs connected to the neighbor BS, a determination unit for determining a first priority among PMI requests of the MSs according to the priority metric, and a selector for selecting a PMI according to the first priority.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention described below relate to a technique for inter-cell interference cancellation in a Multiple Input Multiple Output (MIMO) wireless communication system. Although an Orthogonal Frequency Division Multiplexing (OFDM)/Orthogonal Frequency Division Multiple Access (OFDMA)-based wireless communication system will be described hereinafter as an example, the present invention can also equally apply to other types of wireless communication systems.

A MIMO wireless communication system according to an exemplary embodiment of the present invention uses a preceding matrix for inter-cell interference cancellation. That is, in downlink communication, a Base Station (BS) multiplies a Transmit (Tx) signal by the preceding matrix in order to cancel interference with a neighbor cell. The precoding matrix used for interference cancellation is one of a plurality of precoding matrixes, and can be identified by a Precoding Matrix Index (PMI). In an exemplary implementation, a PMI selection process is divided into a first process in which a Mobile Station (MS) feeds back channel state information and a second process in which a Base Station (BS) selects a PMI.

An exemplary process in which an MS feeds back channel state information is performed as follows.

The MS determines a type of information to be fed back according to channel quality for the BS. The channel quality may be indicated by one of a Signal-to-Noise Ratio (SNR), a Carrier to Interference-plus-Noise Ratio (CINR), and a Signal to Interference-plus-Noise Ratio (SINR). If channel quality is greater than a threshold, the MS feeds back general information to a serving BS. For example, when performing single-input-single-output communication, the MS feeds back a Received Signal Strength Indicator (RSSI) and a physical CINR or the like. When performing open-loop MIMO communication, the MS feeds back an effective SINR for each codeword, a MIMO communication scheme, a transmission rank, etc. When performing a closed-loop MIMO communication, the MS feeds back an effective SINR for each codeword, a transmission rank, a PMI for a single-user scheme, and a PMI for a multi-user scheme or the like. The PMI for the single-user scheme and the PMI for the multi-user scheme are used for communication between the serving BS and the MS, and are different from a PMI used for inter-cell interference cancellation according to an exemplary embodiment of the present invention.

On the other hand, if the channel quality is less than the threshold, in addition to the general information, the MS feeds back channel information (e.g., PMI, Normalized Interference Power (NIP), etc.) on one or more neighbor BSs to the serving BS. The PMI may be a worst case PMI that maximizes interference to the MS or a best case PMI that minimizes interference to the MS. A type of the PMI to be fed back may be determined by using an SINR table or under the control of the BS. That is, the MS evaluates a PMI type corresponding to an SINR measured using the SINR table or a PMI type indicated by the BS. Since a different codebook is used according to a transmission rank, the worst case PMI and the best case PMI also differ according to the transmission rank.

That is, the MS determines a PMI according to the determined PMI type, and feeds back the determined PMI to the serving BS. For example, the MS multiplies each of preceding matrixes included in the codebook by a channel matrix for the BS to determine effective channel matrixes for the respective preceding matrixes. When the best case PMI is determined, the MS searches for an effective channel matrix that most weakens a signal received from a neighbor BS among the effective channel matrixes and determines the found effective channel matrix as the best case PMI. Otherwise, when the worst case PMI is determined, the MS searches for an effective channel matrix that most strengthens the signal received from the neighbor BS among the effective channel matrixes and determines the found effective channel matrix as the worst case PMI. Alternatively, the MS determines a best case preceding matrix or a worst case precoding matrix from a channel matrix for the neighbor BS, and selects a PMI of a precoding matrix, which is most similar to the determined preceding matrix among the preceding matrixes included in the codebook, as the best case PMI or the worst case PMI.

If a PMI is fed back, it implies that the MS requests the neighbor BS to cancel interference by using the PMI. In this case, if the worst case PMI is fed back, PMI feedback is a PMI restriction request, and if the best case PMI is fed back, PMI feedback is a PMI recommendation request. Therefore, the MS also feeds back a 1-bit indicator for indicating whether the fed back PMI is the worst case PMI or the best case PMI. The NIP is a ratio of interference power when using the worst case PMI to total interference power received by the MS. In this case, the number of neighbor BSs differs depending on a channel quality value measured by the MS. That is, the lower the channel quality value, the greater the number of neighbor BSs for which channel information is fed back.

A second exemplary process in which a BS selects a PMI is performed as follows. PMI selection is performed by a neighbor BS. That is, a serving BS provides information fed back from an MS to the neighbor BS, and upon receiving the fed back information, the neighbor BS selects a PMI to reduce or cancel interference to the MS. In this case, if a plurality of PMI requests are generated, the PMI requests may collide with one another. That is, to respond to a PMI request from one MS, a PMI request from another MS may have to be denied. If the PMI requests collide, the neighbor BS determines priority of the PMI requests by using an SINR and NIP. The neighbor BS firsts uses NIP of MSs to determine the priority, and if the MSs have similar NIP, uses the SINR to determine the priority. That is, a PMI request has a high priority when a corresponding MS has a high NIP. In addition, if the MSs has similar NIP, the PMI request having the higher priority corresponds to the MS having the lower SINR. Upon determining the priority among the PMI requests as described above, the BS selects a PMI to be used for each subchannel according to the priority.

As described above, the MS feeds back the NIP, and the BS uses the NIP to determine the priority among the PMI requests. However, according to another exemplary embodiment of the present invention, the NIP may be replaced with a differential Channel Quality Indicator (CQI). That is, the MS feeds back the differential CQI instead of the NIP, and the BS uses the differential CQI to determine the priority among the PMI requests. The differential CQI includes information that indicates an amount of channel quality deterioration when using a worst case PMI or an amount of channel quality improvement when using a best case PMI.

In addition, according to another exemplary embodiment of the present invention, interference power may be used for priority determination. That is, the MS feeds back interference power instead of the NIP, and the BS uses the interference power to determine the priority among the PMI requests.

In addition, according to yet another exemplary embodiment of the present invention, the priority can be determined by using at least two of the NIP, the differential CQI, and the interference power.

For convenience of explanation, in an exemplary embodiment of the present invention, a neighbor BS that interferes with an MS is referred to as an 'interfering BS', and parameters fed back to request cooperative interference cancellation are referred to as 'cooperative interference cancellation-related information'.

Hereinafter, exemplary operations of an MS and a BS for performing inter-cell interference cancellation as described above will be described with reference to the accompanying drawings.

Figure 2:
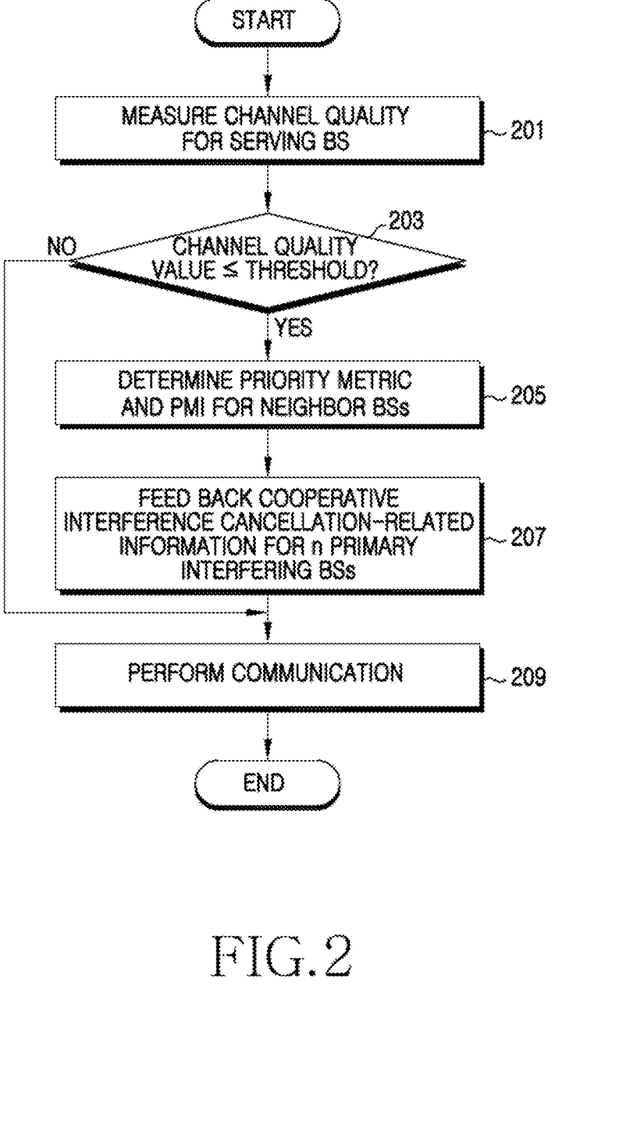
FIG. 2 is a flowchart illustrating an operation of a Mobile Station (MS) in a Multiple Input Multiple Output (MIMO) wireless communication system according to an exemplary embodiment of the present invention.

FIG. 2 is a flowchart illustrating an operation of an MS in a MIMO wireless communication system according to an exemplary embodiment of the present invention.

Referring to FIG. 2, the MS measures channel quality for a serving BS in step 201. In other words, the MS measures a ratio of the power of a signal, which is received from the serving BS through a subchannel allocated by the serving BS, to the power of other signals. The channel quality is one of an SNR, a CINR, and an SINR.

After measuring the channel quality, proceeding to step 203, the MS compares a channel quality value with a threshold for determining whether to request cooperative interference cancellation. If the channel quality value is greater than the threshold, the MS determines not to request cooperative interference cancellation, and proceeds to step 209.

On the other hand, if the channel quality value is less than the threshold, proceeding to step 205, the MS determines a priority metric and a PMI for neighbor BSs. The priority metric is at least one of NIP, a differential CQI, and interference power. That is, the MS determines a best case PMI that minimizes interference when it is used by the neighbor BSs or a worst case PMI that maximizes interference when it is used by the neighbor BSs. If the NIP is fed back, the MS estimates current total interference power and interference power when using the worst case PMI, and then determines the NIP. If the differential CQI is fed back, the MS estimates a channel quality value when using the best case PMI or the worst case PMI, and then determines a difference from the current channel quality value.

After determining the PMI and the priority metric, proceeding to step 207, the MS feeds back cooperative interference cancellation-related information for n primary interfering BSs to the serving BS. The cooperative interference cancellation-related information includes at least one of BS identification information for each of the n primary interfering BSs, a PMI, a PMI type indicator, a priority metric, and an SINR. The PMI is either the best case PMI or the worst case PMI. The PMI type indicator indicates whether the PMI is the best case PMI or the worst case PMI.

After feeding back the cooperative interference cancellation-related information, proceeding to step 209, the MS performs communication. That is, the MS decodes a signal received through a subchannel allocated by the serving BS and thus receives downlink data.

Figure 3:
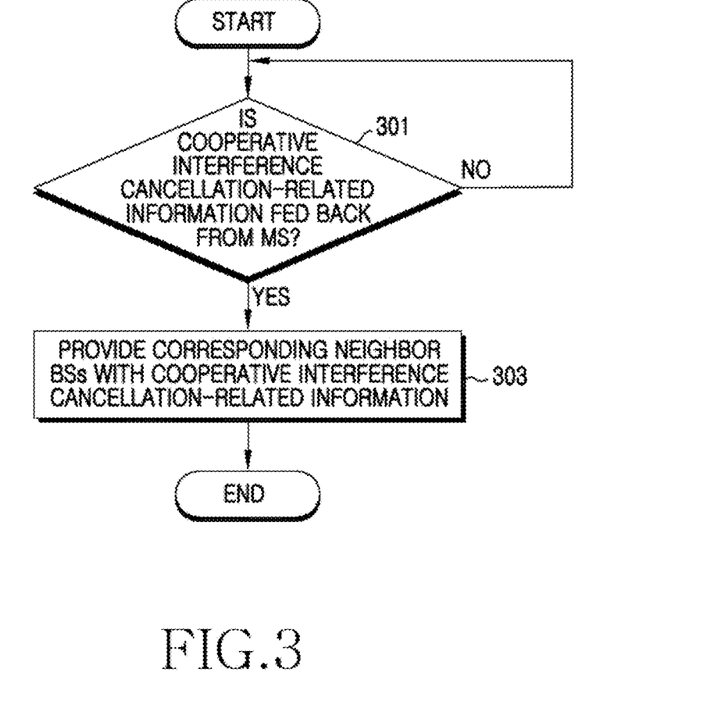
FIG. 3 is a flowchart illustrating an operation of a Base Station (BS) for delivering cooperative interference cancellation-related information in a MIMO wireless communication system according to an exemplary embodiment of the present invention.

FIG. 3 is a flowchart illustrating an operation of a BS for delivering cooperative interference cancellation-related information in a MIMO wireless communication system according to an exemplary embodiment of the present invention.

Referring to FIG. 3, the BS determines whether the cooperative interference cancellation-related information is fed back from an MS in step 301. The cooperative interference cancellation-related information includes at least one of BS identification information for each of n primary interfering BSs, a PMI, a PMI type indicator, a priority metric, and an SINR. The priority metric is at least one of NIP, a differential CQI, and interference power. The PMI is either the best case PMI or the worst case PMI. The PMI type indicator indicates whether the PMI is the best case PMI or the worst case PMI.

When the cooperative interference cancellation-related information is fed back, proceeding to step 303, the BS provides the cooperative interference cancellation-related information to corresponding neighbor BSs through a backbone network. That is, since the cooperative interference cancellation-related information includes information to be provided to each of the n primary interference BSs, the BS classifies the cooperative interference cancellation-related information according to a destination BS, and provides the classified information to n neighbor BSs.

Figure 4:
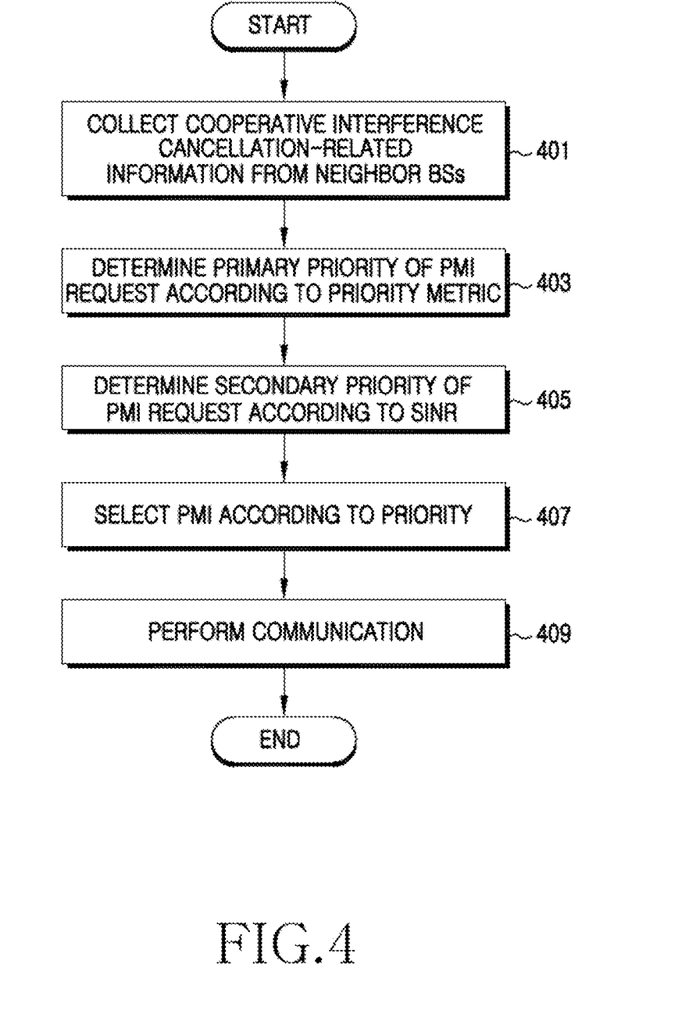
FIG. 4 is a flowchart illustrating an operation of a BS for selecting a Precoding Matrix Index (PMI) in a MIMO wireless communication system according to an exemplary embodiment of the present invention.

FIG. 4 is a flowchart illustrating an operation of a BS for selecting a PMI in a MIMO wireless communication system according to an exemplary embodiment of the present invention.

Referring to FIG. 4, the BS collects cooperative interference cancellation-related information received from neighbor BSs in step 401. That is, the BS collects at least one of a PMI determined by each of MSs connected to the neighbor BSs, a PMI type indicator, a priority metric, and an SINR. The priority metric is at least one of NIP, a differential CQI, and interference power. The PMI is either the best case PMI or the worst case PMI. The PMI type indicator indicates whether the PMI is the best case PMI or the worst case PMI.

After collecting the cooperative interference cancellation-related information, proceeding to step 403, the BS determines a primary priority of each of PMI requests according to the priority metric included in the cooperative interference cancellation-related information and received from each MS. For example, if the priority metric indicates an amount of channel quality improvement when using the NIP or the best case PMI, the BS assigns a high priority to a PMI request corresponding to a high differential CQI or high NIP. If the priority metric indicates an amount of channel quality deterioration when using the worst case PMI, the BS assigns a high priority to a PMI request corresponding to a low differential CQI. If at least two of the NIP, the differential CQI, and the interference power are fed back as the priority metric, the BS assigns priority by combining the at least two indices.

After determining the primary priority, proceeding to step 405, the BS determines a secondary priority of each of the PMI requests of the MSs according to the SINR included in the cooperative interference cancellation-related information and provided from each MS. The secondary priority is provided for PMI requests whose priority is not clearly determined by the primary priority determination. Therefore, according to the SINR, the BS determines the secondary priority among PMI requests corresponding to priority metrics having a difference within a preset range. That is, the BS assigns a high priority to a PMI request corresponding to a low SINR.

After determining the secondary priority, proceeding to step 407, the BS selects a PMI for inter-cell interference cancellation according to the priority determined in step 403 and step 405. That is, the BS selects a PMI according to a PMI request of an MS assigned with a high priority. In this case, if the PMI request is a recommendation request, the BS selects a recommendation requested PMI, and if the PMI request is a restriction request, the BS selects a PMI from the remaining PMIs other than a restriction requested PMI.

After selecting the PMI, proceeding to step 409, the BS transmits a precoded downlink signal by using a precoding matrix corresponding to the PMI. That is, the BS multiplies a Tx signal by the precoding matrix, and then transmits the Tx signal multiplied by the precoding matrix.

The operation of the BS described above with reference to FIG. 4 is an exemplary PMI selection operation depending on PMI requests of MSs using the same radio resource. If the radio resource is used by being identified for each subchannel, that is, if the radio resource is allocated to the MSs on a subchannel basis, each subchannel may be used by different MSs. In this case, the BS performs the operation of FIG. 4 for each subchannel. In other words, the BS collects cooperative interference cancellation-related information for each subchannel, and selects a PMI for each subchannel on the basis of the collected information.

Hereinafter, exemplary structures of an MS and a BS for performing inter-cell interference cancellation as described above will be described with reference to the accompanying drawings.

Figure 5:
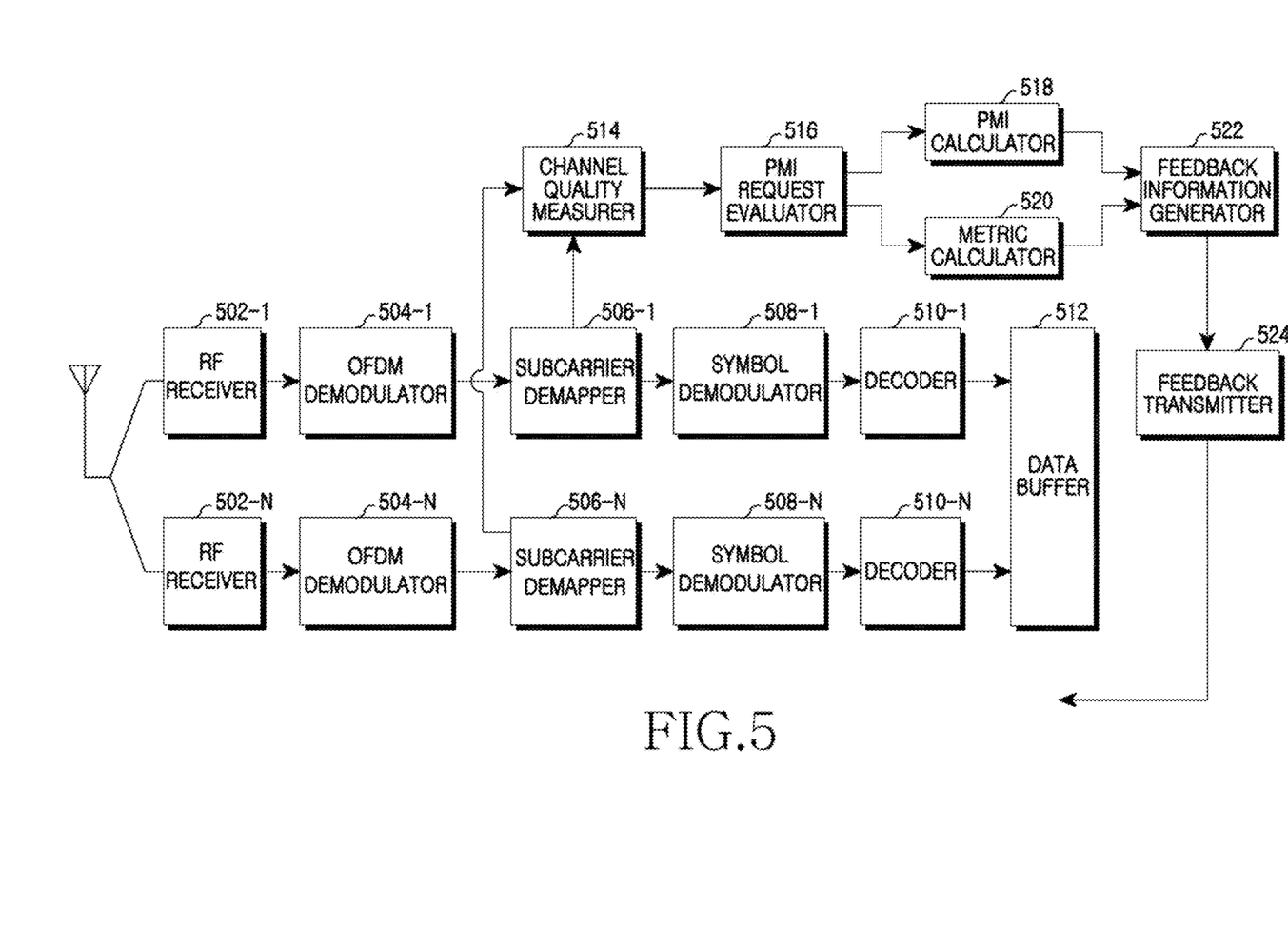
FIG. 5 is a block diagram illustrating a structure of an MS in a MIMO wireless communication system according to an exemplary embodiment of the present invention.

FIG. 5 is a block diagram illustrating a structure of an MS in a MIMO wireless communication system according to an exemplary embodiment of the present invention.

Referring to FIG. 5, the MS includes a plurality of Radio Frequency (RF) receivers 502-1 to 502-N, a plurality of OFDM demodulators 504-1 to 504-N, a plurality of subcarrier demappers 506-1 to 506-N, a plurality of symbol demodulators 508-1 to 508-N, a plurality of decoders 510-1 to 510-N, a data buffer 512, a channel quality measurer 514, a PMI request evaluator 516, a PMI calculator 518, a metric calculator 520, a feedback information generator 522, and a feedback transmitter 524.

Each of the RF receivers 502-1 to 502-N converts an RF signal received through an antenna into a baseband signal. Each of the RF receivers 502-1 to 502-N divides the baseband signal on an OFDM symbol basis, removes a Cyclic Prefix (CP), and restores complex symbols mapped to a frequency domain by performing a Fast Fourier Transform (FFT) operation. Each of the symbol demodulators 508-1 to 508-N demodulates the complex symbols to convert them into encoded bit-streams. Each of the decoders 510-1 to 510-N decodes the encoded bit-streams. The data buffer 512 temporarily stores information bit-streams decoded by the decoders 510-1 to 510-N.

The channel quality measurer 514 measures channel quality for a serving BS by using signals provided from the subcarrier demappers 506-1 to 506-N. In other words, the channel quality measurer 514 measures a ratio of power of a signal, which is received from the serving BS through a subchannel allocated by the serving BS, to power of other signals. The channel quality is one of an SNR, a CINR, and an SINR. In addition, the channel quality measurer 514 measures interference power from neighbor BSs.

The PMI request evaluator 516 uses a channel quality value measured by the channel quality measurer 514 to determine whether to request cooperative interference cancellation. That is, the PMI request evaluator 516 compares a channel quality value with a threshold for determining whether to request cooperative interference cancellation. If the channel quality value is greater than the threshold, the PMI request evaluator 516 determines not to request cooperative interference cancellation. Otherwise, if the channel quality value is less than or equal to the threshold, the PMI request evaluator 516 determines to request cooperation interference cancellation. Further, the PMI request evaluator 516 selects n primary interfering BSs according to an interference power level, and reports the result of selecting the n primary interfering BSs to the PMI calculator 518 and the metric calculator 520.

The PMI calculator 518 calculates a PMI to be requested from an interfering BS according to the result determined by the PMI request evaluator 516. That is, the PMI calculator 518 calculates a best case PMI that minimizes interference when it is used by the neighbor BSs or a worst case PMI that maximizes interference when it is used by the neighbor BSs. Further, the PMI calculator 518 provides the calculated PMI to the feedback information generator 522, and reports whether the provided PMI is the best case PMI or the worst case PMI. In this case, the PMI calculator 518 calculates PMIs to be requested to the respective n primary interfering BSs.

The metric calculator 520 calculates a priority metric for the interfering BS. The priority metric is at least one of NIP, a differential CQI, and interference power. For example, if the NIP is fed back, the metric calculator 520 estimates interference power when using the worst case PMI, and evaluates current overall interference power. Thereafter, the metric calculator 520 divides interference power when using the worst case PMI by the overall interference power and thus calculates the NIP. Alternatively, if the differential CQI is fed back, the metric calculator 520 estimates a channel quality value when using the best case PMI or the worst case PMI, and then calculates a difference from the current channel quality value. In this case, the metric calculator 520 calculates a priority metric for each of the n primary interfering BSs.

The feedback information generator 522 generates information to be fed back to the serving BS. In particular, the feedback information generator 522 generates cooperative interference cancellation-related information to request cooperative interference cancellation. The cooperative interference cancellation-related information generated by the feedback information generator 522 includes identification information of the interfering BS, a PMI provided from the PMI calculator 518, a PMI type indicator, a priority metric provided from the metric calculator 520, and an SINR for the serving BS. In this case, the cooperative interference cancellation-related information may be information for each of the n primary interfering BSs. The cooperative interference cancellation-related information includes identification information of n interfering BSs, n PMIs, n PMI type indicators, and n priority metrics.

The feedback transmitter 524 transmits feedback information generated by the feedback information generator 522, in particular, the cooperative interference cancellation-related information, to the serving BS. That is, the feedback transmitter 524 converts the cooperative interference cancellation-related information into a signal by performing encoding and demodulation, configures an OFDM symbol by performing an Inverse Fast Fourier Transform (IFFT) operation and a CP inserting operation, and then transmits the OFDM symbol through one or more antennas.

Figure 6:
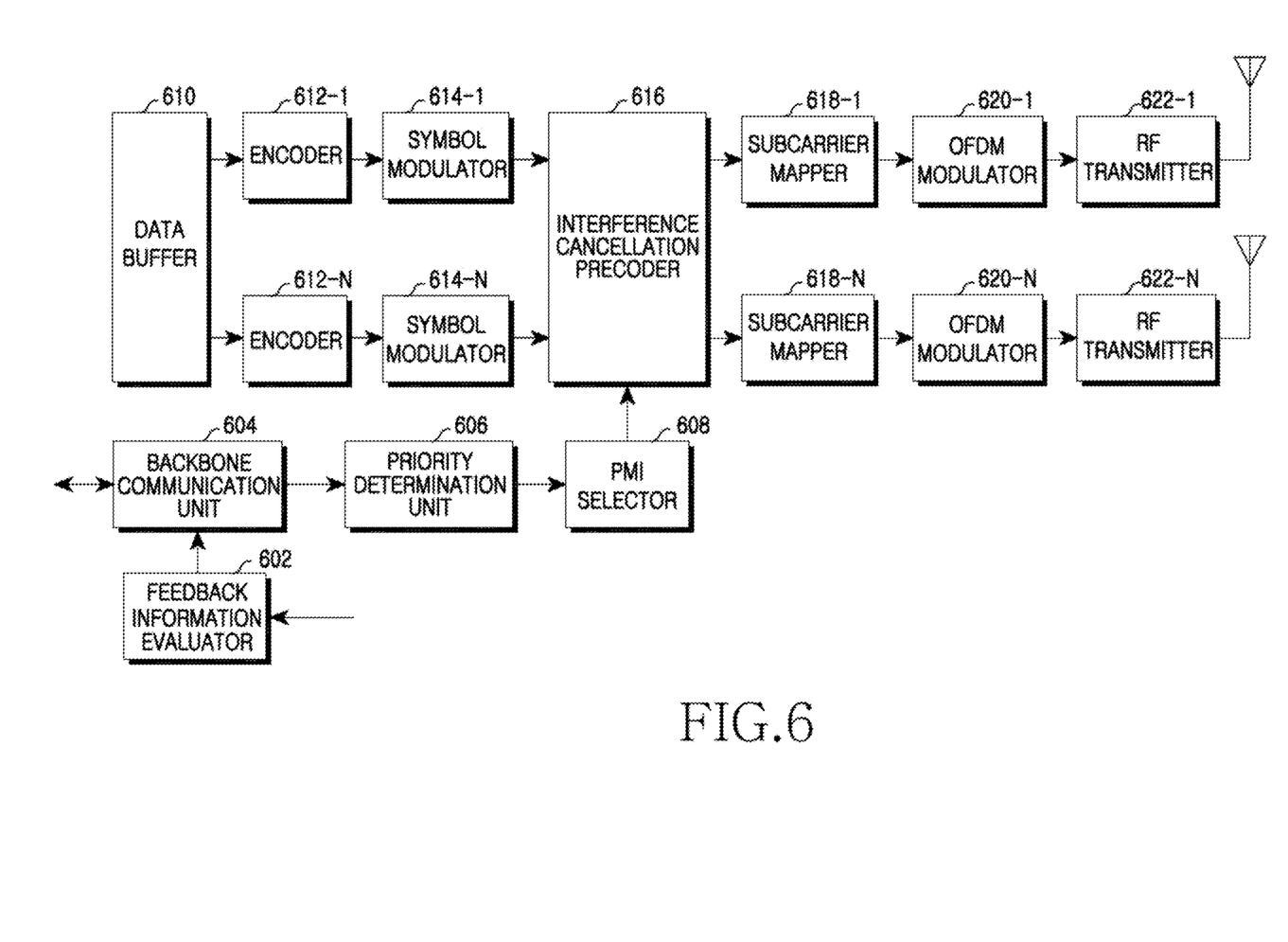
FIG. 6 is a block diagram illustrating a structure of a BS in a MIMO wireless communication system according to an exemplary embodiment of the present invention.

FIG. 6 is a block diagram illustrating a structure of a BS in a MIMO wireless communication system according to an exemplary embodiment of the present invention.

Referring to FIG. 6, the BS includes a feedback information evaluator 602, a backbone communication unit 604, a priority determination unit 606, a PMI selector 608, a data buffer 610, a plurality of encoders 612-1 to 612-N, a plurality of symbol modulators 614-1 to 614-N, an interference cancellation precoder 616, a plurality of subcarrier mappers 618-1 to 618-N, a plurality of OFDM modulators 620-1 to 620-N, and a plurality of RF transmitters 622-1 to 622-N.

The feedback information evaluator 602 evaluates information fed back from an MS. In particular, the feedback information evaluator 602 evaluates cooperative interference cancellation-related information fed back from the MS. The cooperative interference cancellation-related information includes at least one of BS identification information for each of n primary interfering BSs, a PMI, a PMI type indicator, a priority metric, and an SINR. The priority metric is at least one of NIP, a differential CQI, and interference power. The PMI is either the best case PMI or the worst case PMI. The PMI type indicator indicates whether the PMI is the best case PMI or the worst case PMI.

The backbone communication unit 604 provides an interface to perform communication with neighbor BSs through a backbone network. In particular, when the cooperative interference cancellation-related information is fed back from the MS, the backbone communication unit 604 provides the cooperative interference cancellation-related information to corresponding neighboring BSs through the backbone network. That is, since the cooperative interference cancellation-related information includes information to be provided to each of the n primary interference BSs, the backbone communication unit 604 classifies the cooperative interference cancellation-related information according to a destination BS, and provides the classified information to n neighbor BSs. Further, the backbone communication unit 604 collects cooperative interference cancellation-related information of MSs connected to the neighboring BSs, wherein the cooperative interference cancellation-related information is provided from the neighboring BSs.

The priority determination unit 606 determines priority among PMI requests by using the collected cooperative interference cancellation-related information of the MSs. To determine the priority, the priority determination unit 606 uses an SINR and a priority metric included in the cooperative interference cancellation-related information. More specifically, the priority determination unit 606 determines a primary priority of each of PMI requests according to the priority metric included in the cooperative interference cancellation-related information and received from each MS. For example, if the priority metric indicates an amount of channel quality improvement when using the NIP or the best case PMI, the priority determination unit 606 assigns a high priority to a PMI request corresponding to a high differential CQI or high NIP. If the priority metric indicates an amount of channel quality deterioration when using the worst case PMI, the priority determination unit 606 assigns a high priority to a PMI request corresponding to a low differential CQI. If at least two of the NIP, the differential CQI, and the interference power are fed back as the priority metric, the priority determination unit 606 assigns priority by combining the at least two indices.

After determining the primary priority, the priority determination unit 606 determines a secondary priority of each of the PMI requests of the MSs according to the SINR. The secondary priority is provided for PMI requests whose priority is not clearly determined by the primary priority determination. Therefore, according to the SINR, the priority determination unit 606 determines the secondary priority among PMI requests corresponding to priority metrics having a difference within a preset range. That is, the priority determination unit 606 assigns a high priority to a PMI request corresponding to a low SINR.

The PMI selector 608 selects a PMI to be used for inter-cell interference cancellation. In this case, the PMI selector 608 selects a PMI according to the priority determined by the priority determination unit 606. That is, the PMI selector 608 selects a PMI according to a PMI request of an MS assigned with a high priority. In this case, if the PMI request is a recommendation request, the PMI selector 608 selects a recommendation request PMI, and if the PMI request is a restriction request, the PMI selector 608 selects a PMI from the remaining PMIs other than a restriction requested PMI.

The data buffer 610 temporarily stores data to be transmitted to the BS, and outputs the stored data when a transmission time elapses. Each of the encoders 612-1 to 612-N encodes a data bit-stream provided from the data buffer 610. Each of the symbol modulators 614-1 to 614-N modulates the encoded bit-stream and thus converts the bit-stream into complex symbols. The interference cancellation precoder 616 performs precoding for inter-cell interference cancellation. That is, the interference cancellation precoder 616 performs precoding on Tx signals by using a preceding matrix corresponding to a PMI selected by the PMI selector 608. In other words, the interference cancellation precoder 616 multiplies the Tx signals by the preceding matrix corresponding to the selected PMI.

Each of the subcarrier mappers 618-1 to 618-N maps Tx signals, which are on its corresponding transmission path among the precoded Tx signals, onto subcarriers and thus configures frequency-domain signals. Each of the OFDM modulators 620-1 to 620-N converts the frequency-domain signals into time-domain signals by performing an IFFT operation, and then configures baseband OFDM symbols by inserting a CP. Each of the RF transmitters 622-1 to 622-N converts the baseband OFDM symbols into an RF signal, and then transmits the RF signal through an antenna.

According to exemplary embodiments of the present invention, a MIMO system selects a PMI for interference cancellation according to priority determined by a differential CQI or NIP calculated by an MS. Therefore, a BS can effectively perform cooperative inter-cell interference cancellation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Mobile Station (MS) in a Multiple Input Multiple Output (MIMO) wireless communication system, the method comprising:
   determining a Precoding Matrix Index (PMI) type indicated by a serving Base Station (BS), wherein the PMI type indicates which PMI is required to report among a worst case PMI that maximizes interference to the MS and a best case PMI that minimizes interference to the MS;
   measuring channel quality for the serving BS and interference power from one or more neighbor BSs;
   determining a PMI and a priority metric for each neighbor BS; and
   feeding back the channel quality and at least one of the PMI, a PMI type indicator and the priority metric to the serving BS,
   wherein the PMI comprises one of the worst case PMI and the best case PMI, and
   wherein the priority metric comprises a differential Channel Quality Indicator (CQI) that represents CQI gain when the PMI is used.

2. The method of claim 1,
   wherein the PMI type indicator comprises information that indicates whether the PMI is the one of the worst case PMI and the best case PMI.

3. The method of claim 1, wherein the channel quality comprises one of a Signal-to-Noise Ratio (SNR), a Carrier to Interference-plus-Noise Ratio (CINR), and a Signal to Interference-plus-Noise Ratio (SINR).

4. The method of claim 1, wherein the priority metric further comprises at least one of Normalized Interference Power (NIP) and interference power.

5. The method of claim 1, wherein the measuring channel quality for the serving BS and the interference power from the one or more neighbor BSs comprises:
   measuring the channel quality for the serving BS; and
   if the channel quality is less than a threshold, measuring the interference power from the one or more neighbor BSs.

6. A method of operating a Base Station (BS) in a Multiple Input Multiple Output (MIMO) wireless communication system, the method comprising:
   indicating a Precoding Matrix Index (PMI) type to at least one Mobile Stations (MS) connected to the BS, wherein the PMI type indicates which PMI is required to report among a worst case PMI that maximizes interference to the at least one MS and a best case PMI that minimizes interference to the at least one MS;
   receiving, from a neighbor BS, cooperative interference cancellation-related information including a priority metric and PMI requests of MSs connected to the neighbor BS;
   determining a first priority among PMI requests of the MSs according to the priority metric; and
   selecting a PMI according to the first priority,
   wherein the priority metric comprises a differential Channel Quality Indicator (CQI) that represents CQI gain when a feed backed PMI is used.

7. The method of claim 6,
   wherein each of the PMI requests comprises one of a restriction request for a worst case PMI that maximizes interference to a respective MS of the MSs and a recommendation request for a best case PMI that minimizes interference to the respective MS, and
   wherein the cooperative interference cancellation-related information includes a PMI type indicator that indicates whether each of the PMI requests comprises one of the restriction request and the recommendation request.

8. The method of claim 6, further comprising:
   after determining the first priority according to the priority metric, determining a second priority, among PMI requests corresponding to priority metrics having a difference within a preset range, according to a Signal to Interference-plus-Noise Ratio (SINR).

9. The method of claim 8, wherein the priority metric further comprises at least one of Normalized Interference Power (NIP) and interference power.

10. The method of claim 9, wherein the determining of the first priority among the PMI requests of the MSs comprises, if the priority metric indicates an amount of channel quality improvement when using one of the NIP and the best case PMI, assigning a high priority to a PMI request, among the PMI requests, corresponding to a high priority metric.

11. The method of claim 9, wherein the determining of the first priority among the PMI requests of the MSs comprises, if the priority metric indicates an amount of channel quality deterioration when using the worst case PMI, assigning a high priority to a PMI request, among the PMI requests, corresponding to a low priority metric.

12. The method of claim 8, wherein the determining of the second priority according to the SINR comprises assigning a high priority to a PMI request, among the PMI requests, corresponding to a low SINR.

13. The method of claim 6, wherein the selecting of the PMI according to the first priority comprises:
   if a PMI request of an MS assigned with a high priority, among the PMI requests of the MSs, is a recommendation request, selecting a recommendation requested PMI; and
   if the PMI request of the MS assigned with the high priority, among the PMI requests of the MSs, is a restriction request, selecting a PMI from the remaining PMIs other than a restriction requested PMI.

14. The method of claim 6, further comprising:
after selecting the PMI, transmitting a precoded downlink signal by using a precoding matrix corresponding to the PMI.

15. The method of claim 6, further comprising:
receiving cooperative interference cancellation-related information for at least one neighbor BS fed back from the MSs; and
providing the cooperative interference cancellation-related information for the at least one neighbor BS to the at least one neighbor BS.

16. A Mobile Station (MS) apparatus in a Multiple Input Multiple Output (MIMO) wireless communication system, the apparatus comprising:
an evaluator for determining a Precoding Matrix Index (PMI) type indicated by a serving Base Station (BS), wherein the PMI type indicates which PMI is required to report among a worst case PMI that maximizes interference to the MS and a best case PMI that minimizes interference to the MS;
a measurer for measuring channel quality for the serving BS and interference power from one or more neighbor BSs;
a calculator for determining a PMI and a priority metric for each neighbor BS; and
a transmitter for feeding back the channel quality and at least one of the PMI, a PMI type indicator, and the priority metric to the serving BS,
wherein the PMI comprises one of the worst case PMI and the best case PMI, and
wherein the priority metric comprises a differential Channel Quality Indicator (CQI) that represents CQI gain when the PMI is used.

17. The apparatus of claim 16,
wherein the PMI type indicator is information that indicates whether the PMI comprises the one of the worst case PMI and the best case PMI.

18. The apparatus of claim 16, wherein the channel quality comprises one of a Signal-to-Noise Ratio (SNR), a Carrier to Interference-plus-Noise Ratio (CINR), and a Signal to Interference-plus-Noise Ratio (SINR).

19. The apparatus of claim 16, wherein the priority metric further comprises at least one of Normalized Interference Power (NIP) and interference power.

20. The apparatus of claim 16, wherein the measurer measures the interference power from the one or more neighbor BSs, if the channel quality is less than a threshold.

21. A Base Station (BS) apparatus in a Multiple Input Multiple Output (MIMO) wireless communication system, the apparatus comprising:
a communication unit for indicating a Precoding Matrix Index (PMI) type to at least one Mobile Stations (MSs) connected to the BS, wherein the PMI type indicates which PMI is required to report among a worst case PMI that maximizes interference to the at least one MS and a best case PMI that minimizes interference to the at least one MS, and for receiving, from a neighbor BS, cooperative interference cancellation-related information including a priority metric and PMI requests of MSs connected to the neighbor BS;
a determination unit for determining a first priority among PMI requests of the MSs according to the priority metric; and
a selector for selecting a PMI according to the first priority,
wherein the priority metric comprises a differential Channel Quality Indicator (CQI) that represents CQI gain when a feed backed PMI is used.

22. The apparatus of claim 21,
wherein each of the PMI requests comprises one of a restriction request for a worst case PMI that maximizes interference to a respective MS of the MSs and a recommendation request for a best case PMI that minimizes interference to the respective MS, and
wherein the cooperative interference cancellation-related information includes a PMI type indicator that indicates whether each of the PMI requests comprises one of the restriction request and the recommendation request.

23. The apparatus of claim 21, wherein, after determining the first priority according to the priority metric, the determination unit determines a second priority, among PMI requests corresponding to priority metrics having a difference within a preset range, according to a Signal to Interference-plus-Noise Ratio (SINR).

24. The apparatus of claim 23, wherein the priority metric further comprises at least one of Normalized Interference Power (NIP) and interference power.

25. The apparatus of claim 24, wherein, if the priority metric indicates an amount of channel quality improvement when using one of the NIP and the best case PMI, the determination unit assigns a high priority to a PMI request, among the PMI requests, corresponding to a high priority metric.

26. The apparatus of claim 24, wherein, if the priority metric indicates an amount of channel quality deterioration when using the worst case PMI, the determination unit assigns a high priority to a PMI request, among the PMI requests, corresponding to a low priority metric.

27. The apparatus of claim 23, wherein the determination unit assigns a high priority to a PMI request, among the PMI requests, corresponding to a low SINR.

28. The apparatus of claim 21, wherein, if a PMI request of an MS assigned with a high priority, among the PMI requests of the MSs, is a recommendation request, the selector selects a recommendation requested PMI, and if the PMI request of the MS assigned with the high priority, among the PMI requests of the MSs, is a restriction request, the selector selects a PMI from the remaining PMIs other than a restriction requested PMI.

29. The apparatus of claim 21, further comprising:
a precoder for precoding a downlink signal by using a precoding matrix corresponding to the PMI selected by the selector; and
a transmitter for transmitting the precoded downlink signal.

30. The apparatus of claim 21, further comprising:
a receiver for receiving cooperative interference cancellation-related information for at least one neighbor BS fed back from the MSs,
wherein the communication unit provides the cooperative interference cancellation-related information for at least one neighbor BS to the at least one neighbor BS.

* * * * *